United States Patent [19]

Feinbloom

[11] 4,272,161
[45] Jun. 9, 1981

[54] METHOD OF SPLITTING A PARALLEL BEAM OF LIGHT AT FIRST AND SECOND CAMERA LOCATIONS TO PROVIDE PAR FOCAL REGISTRATION

[75] Inventor: Richard E. Feinbloom, New York, N.Y.

[73] Assignee: Designs for Vision, Inc., New York, N.Y.

[21] Appl. No.: 957,109

[22] Filed: Nov. 2, 1978

Related U.S. Application Data

[60] Division of Ser. No. 888,349, Mar. 20, 1978, Pat. No. 4,143,938, which is a continuation of Ser. No. 771,181, Feb. 23, 1977, abandoned.

[51] Int. Cl.³ .............................................. G02B 21/18
[52] U.S. Cl. ............................................................ 350/320
[58] Field of Search ...................... 350/320, 17, 19, 34, 350/9; 354/79; 352/131; 358/97

[56] References Cited

U.S. PATENT DOCUMENTS

| | | | |
|---|---|---|---|
| 2,604,832 | 7/1952 | Barcus | 350/19 |
| 2,614,454 | 10/1952 | Steffen | 350/19 |
| 2,838,601 | 6/1958 | Lavanaugh et al. | 358/97 |
| 3,124,682 | 3/1964 | Kojima et al. | 350/19 |
| 3,656,829 | 4/1972 | Wilms | 350/19 |
| 4,143,938 | 3/1979 | Feinbloom | 350/34 |

OTHER PUBLICATIONS

*Webster's Third New International Dictionary of the English Language Unabridged,* 3rd Ed., 1961, p. 1641.
Beensen et al., Jena Review, vol. 21, No. 5, pp. 242-250, 1976.

*Primary Examiner*—Jon W. Henry
*Attorney, Agent, or Firm*—Arthur L. Plevy

[57] ABSTRACT

There is disclosed a method of splitting a parallel beam of light indicative of the imaging of an object viewed by a microscope to enable par focal registration of said image at first and second camera locations. A parallel beam of light is directed to propagate through a first input aperture where the beam is converged and then bent at a predetermined distance from the aperture at an angle of 90° to direct said bent beam to the second location where a television camera is positioned to receive the bent beam in proper image orientation and at par focal registration. The converged beam is then diverged as directed through said input aperture and propagated to the first location where a camera is placed for receiving the diverged beam at par focal registration.

6 Claims, 3 Drawing Figures

METHOD OF SPLITTING A PARALLEL BEAM OF LIGHT AT FIRST AND SECOND CAMERA LOCATIONS TO PROVIDE PAR FOCAL REGISTRATION

This is a divisional of continuation application Ser. No. 888,349, filed on Mar. 20, 1978, now Pat. No. 4,143,938 which is a continuation of application Ser. No. 771,181 filed on Feb. 23, 1977 now abandoned.

BACKGROUND OF INVENTION

This invention relates to optical equipment and more particularly to a switchable optical adapter or coupler to enable the selective use of multiple cameras or photographic devices particularly during research or medical procedures.

During present day medical or surgical practices, as well as in the general field of research, one so engaged employs devices such as microscopes and other optical aids to enable the monitoring of the procedures and to provide both permanent and visual records of the progress. In particular, the field of neurosurgery requires the physician or surgeon to employ a microscope to enable him to adequately and reliably perform the delicate operation. Hence, there exists many microscopes which are employed both in surgery and in research to enable one to accurately view the condition of the area affected and to provide a permanent record of this area as the operation or research progresses. Hence, such instruments have been referred to as operating room or surgical microscopes.

In modern day practice, a television camera is coupled to the optical path of the microscope to enable the surgical team to follow the procedures on a television monitor. A 35 millimeter or equivalent camera is also required and coupled to the optical path of the microscope to take permanent pictures for purposes of medical records, lectures, papers and so on. While the surgeon must have access to the main eyepiece of the microscope, a further coupling to the optical path of the microscope is afforded to enable a surgical assistant to observe the procedure as it progresses. Hence as can be seen, there are at least three essential attachments required during surgery and which are desirably coupled to the optical path of the microscope.

Generally speaking, the prior art permits the coupling of a maximum of two devices to the optical path of a microscope. If a third device is to be employed, then one attachment must be removed and replaced. This, of course, implies the loss of a valuable viewing aid as well as the time and concentration expended in connecting and disconnecting apparatus.

In general, the prior art uses an optical beam splitter which is positioned in the optical path of a microscope. The beam splitter has two ports for attaching external equipment thereto, and hence one port may accommodate a television camera while the other port may accommodate a surgical assistant's stero microscope or a camera, and so on.

The difficulty with a beam splitter is the limited number of ports. The limitation on the number of ports is due to the loss of light experienced when a beam splitter is employed. Basically, the beam splitter may include a suitable prism or associated lenses which split the microscope light beam and direct the optical energy to both ports. While such beam splitters can increase the amount of light at a port, they do so by reducing the amount of light to the main microscope. A further problem exists in that the coupling of an instrument to a port of the beam splitter requires an appropriate lens or optical matching assembly to enable proper use.

In the operating room microscope, the beam splitter as indicated, is employed to divide the main beam of light. The main beam of light in a microscope comprises parallel rays and hence, the light emanating from the ports of the beam splitter are also parallel. To use a port with a camera as a television or 35 millimeter device requires that the light be focused or directed to form a suitable image size for the camera. Thus the instruments to be employed at the ports of a beam splitter have to be both mechanically and optically coupled to enable proper operation.

Thus the present invention is concerned with an optical coupling device or adapter which has an input port for attachment to a first port of a beam splitter. The device has two outputs to enable the coupling of a television or movie camera to one output and a 35 millimeter or other camera to the other output. The cameras thus coupled to the adapter can be selected during an operation by a switch, which determines which device will be exposed to the optical beam. The coupler or adapter devices further assure that the camera associated with an output receives an optically correct image. Thus, one is enabled to monitor the operation by both, for example, a television and a permanent camera, while leaving one port of the beam splitter free to accommodate a surgical binocular tube for use by a surgical assistant. A switch permits control of the adapter so that the user can switch from the television camera mode to a permanent camera mode simply and reliably while further assuring that the light rays directed to the photographic equipment are properly sized and focused.

BRIEF DESCRIPTION OF PREFERRED EMBODIMENT

An optical coupler apparatus for use with a parallel beam of light rays for selectively directing said beam, comprising a housing having an input port and a first output port relatively transverse to said input port, said input and output ports communicating with an internal hollow of said housing, a second output port relatively coaxial with said input port and located on an opposite side of said housing, a first lens positioned at said input port to cause said light beam directed through said port to be converged by said lens, a second lens positioned at said second output port to cause light directed and converged by said first lens to diverge at said output port, a mirror having a first and second selectable position, said mirror pivotally mounted on said housing and positioned in said internal hollow between said input and second ports and said mirror operating when in said first position to reflect light from said first lens solely to said first transverse port and when selected in said second position to block said first port to cause said light directed from said input port to pass through said second lens at said second port.

DETAILED DESCRIPTION OF THE FIGURES

Figure 1:
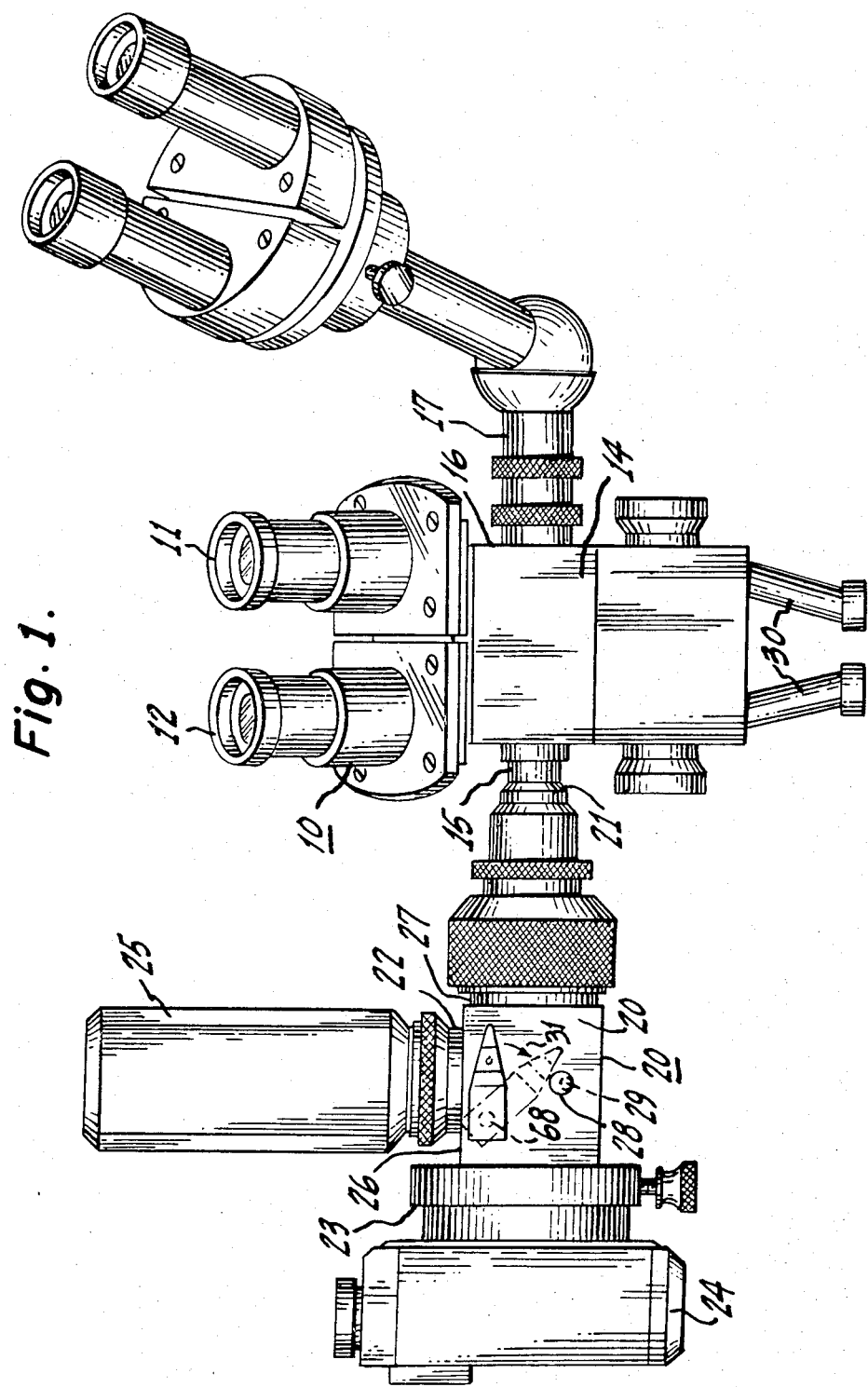
FIG. 1 is a diagrammatic view of an optical coupling device position with respect to a microscope according to this invention.

Referring to FIG. 1, there is shown a typical operating room microscope 10. It is noted at the onset that while a particular type of microscope is shown, that the optical coupling device to be described herein has greater utility and could be used in conjunction with other types of optical apparatus.

Essentially, the microscope 10 is a binocular device and has suitable left and right eyepieces 11 and 12. Coupled within the optical path of the microscope 10 is a beam splitter device 14. The beam splitter 14 is essentially a device which may employ prismatic lens assemblies to split the beam along the optical axis of the microscope 10 and direct the split beams to an output port 15 and an output port 16.

Essentially, such beam splitters are well known in the art and are provided for by many manufacturers. A typical beam splitter which can be employed in conjunction with such a microscope is manufactured by the Carl Zeiss Co. of West Germany.

A beam splitter such as 14 enables a user to mount accessories thereto for co-observation and documenation. For example, during the course of an operation or procedure, one port as 16 of the beam splitter may be desirably coupled to an observer tube 17. In this manner, a surgical assistant would be able to monitor the operation and make the necessary observations while the surgeon in charge would be employing eyepieces 11 and 12 to enable him to view the operative site. The other port as 15 would be coupled to a suitable piece of photographic apparatus such as a television camera, Polaroid camera or any other type of conventional camera. It is, of course, noted that to achieve such coupling one must also assure that the camera device receives the proper size and focused image so that it can adequately document the progress of the operation.

In any event, due to the limitations of optical energy and so on, a typical beam splitter as 14 possesses two ports as 15 and 16. Hence, in order to convert from a television camera use to a permanent type of camera, one would have to remove any apparatus coupled to an associated port and replace it with alternate apparatus. This is so, as it is a primary objective, especially during surgical procedure, to have an observer tube as 17 constantly coupled to the beam splitter port 16. This is especially true considering the fact that often times, a resident or or a relatively inexperienced surgeon may be performing a part of an operation while his teacher would be viewing progress through a tube or device as 17.

As previously indicated, there are three essential attachments associated with an operating microscope as 10 during surgical procedure. Hence, one usually requires a television camera that enables the surgical team to follow procedure on a television monitor. One also requires a 35 millimeter camera or a still camera which is used to take pictures for medical records and other purposes as well as requiring a tube as 17 for the surgical assistant.

In any event, to supply a beam splitter with additional ports presents a problem in that there is a loss of light each time an additional port is implemented. In order to circumvent such problems, FIG. 1 depicts an optical coupling device generally designated as 20. The device 20 has a first input port 21 which is suitably coupled to the port 15 of the beam splitter 14.

The coupler 20, as will be explained, has an internal hollow or cavity where light from the beam splitter is directed through the input port to the output ports designated as 22 and 23.

Shown in FIG. 1 is a 35 mm camera 24 which is coupled to port 23 as indicated. While a 35 mm camera is shown, it will be apparent from the following description that any type of camera such as a polaroid camera and so on can be accommodated by the proper selection of lens assemblies associated with the ports.

It is noted that the port 23 coupled to camera 24 is relatively parallel to port 21. Essentially, the ports 21 and 23 are coaxial and the port apertures are located on opposite surfaces of the housing 20. The port 22 has a television camera 25 coupled thereto and port 22 is perpendicular to port 21.

Camera 25 may be a color television camera employing a miniature vidicon. Such cameras as 25 are well known in the prior art and an example of a suitable camera is one manufactured by the Curcon Corporation of Santa Barbara, California or by Hitachi of Woodside, New York.

It is noted that port 22 is located on a surface of housing 20 which is relatively perpendicular or transverse to the surfaces containing ports 21 and 23.

Shown located on the housing 20 is a lever or switch 26. As will be explained, the movement of lever 26 as indicated by arrow 31 causes a pivotable mirror located within the housing to be selected in a first or a second position. The position of the switch is controlled by an eccentric cam member 28 located on the housing and whose function will be explained. For the switch position shown in the figure, light which is directed from the beam splitter into the port 21 passes directly to port 23. The camera 24, as will be explained, is at a par focal placement so that it can be activated as desired. If one moves the lever 26 downwardly so that it contacts the cam surface 28, light from port 21 will be reflected and directed into port 22 to enable the television camera 25 to operate. The television camera 25 also receives a light beam of proper size and focus based on the lens arrangement included in housing 20 and to be described.

Thus, as can be ascertained from FIG. 1, the housing 20 and associated ports function to enable the use of two pieces of photographic equipment by coupling to one port 15 of a beam splitter as 14.

Before proceeding with a more detailed description of the functioning of the coupler or adapter 20, a brief description of the nature of the equipment is believed to be warranted.

In an operating microscope such as 10, the beam splitter 14 is used to divide a beam of light which is referred to in the field of optics as a parallel beam. The parallel beam of light emanating from the beam splitter 14 at port 15 fills the front objective lens associated with the input port 21. This lens is selected to have a focal length which is in part determined by the photographic apparatus as 24 and 25 to be coupled to the output ports 22 and 23.

It is also noted that the television camera 25 is coupled to the transverse port 22. Briefly, the reason for placing the television camera at the transverse port 22 rather than at the back port 23 is because the parallel beam of light which is directed through an objective lens at port 21 is caused to be reflected by a mirror located in the housing and controlled by lever 26. The mirror is at a forty-five degree angle as will be explained, and bends the beam of light ninety degrees. In this manner, the bent beam is focused on the face of the vidicon tube associated with the television camera 25 and also serves to keep the relationship of the objective view correct.

For example, the object which is placed near the microscope lens assembly 30 reflects light along the optical path of the microscope. This light is intercepted by the beam splitter 14. The optics of the beam splitter inverts the image as does for example, a mirror and hence, the object as manifested by the light beam is inverted or backwards. The mirror located within the coupler 20 corrects this so that the image impinging upon the vidicon as reflected from the mirror is seen correctly and hence, the television display is in proper orientation.

The beam of light as transmitted through the input port 21 and associated lens is caused to converge. As will be explained, there is a negative lens system adjacent or associated with port 23. The negative lens system takes the converging beam of light and changes the converging beam to a diverging beam and does so to exactly fill the film plane of the camera 24 which is coupled thereto.

Figure 2:
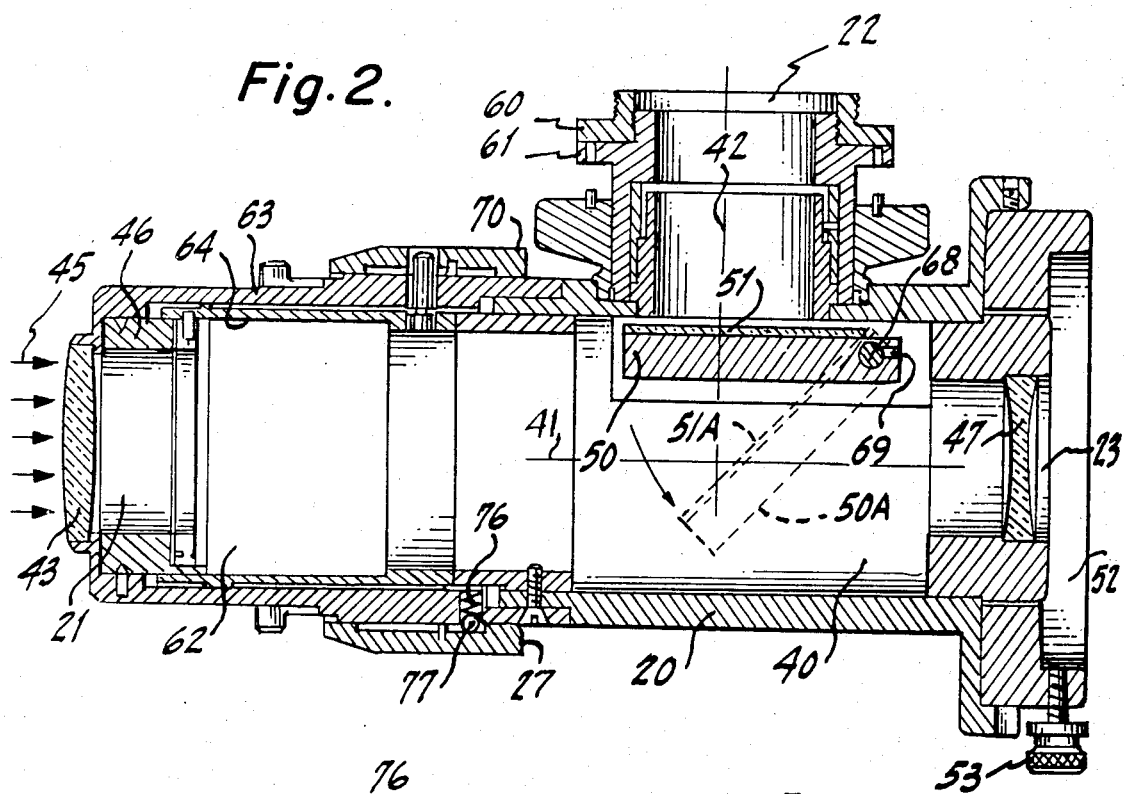
FIG. 2 is a side cross-sectional view of the optical coupling device shown in FIG. 1.

Referring to FIG. 2, there is shown a cross-sectional side view of the housing and coupler 20 of FIG. 1. Similar reference numerals have been retained to designate similar parts.

As previously indicated, the housing 20 has an internal hollow 40. The input port 21 is coaxial with the output port 23 as evidenced by the center line 41. The output port 22 is transverse or perpendicular to ports 21 and 23 as evidenced by line 42 which is shown relatively perpendicular to line 41. The input port 21 has a positive lens 43 positioned at the input opening. The lens 43 is an achromatic lens and is generally of a convex configuration. Such a lens, of course, will take a parallel beam of input light as depicted by arrows 45 and converge the beam.

Located behind the lens 43 is a diaphragm structure 46. The diaphragm structure as is well known, is used to vary the amount of light which is transmitted through port 21 and many examples of suitable diaphragms and typical apparatus are well known in the art.

Shown positioned adjacent the output port 23 is another lens 47. The lens 47 is a negative lens or a concave configuration and serves to diverge a beam of light which may be directed therethrough.

As shown in the figure and positioned within the hollow 40 of housing 20 is a pivotable member 50. The member 50 has a coated mirror surface 51 which faces the opening in port 22. The mirrored surface is well polished and carefully silvered or finished to provide a first surface coated mirror to hence enable the maximum reflection of light with low loss.

In the position shown, the mirrored member 50 serves to block light from port 22 and hence confines the light which is directed via lens 43 within the hollow of the housing to thus achieve a minimum of light loss. In the position shown, the positive lense 43 receives the parallel light beam 45 and converges the beam. The converged beam is directed along center line 41 and is then diverged by lens 47.

The focal length of lens 43 and lens 47 are selected so that a camera such as a 35 mm camera which may be mounted directly at port 23 by means of a retaining screw 53- receives a par focal image.

It is also noted that by changing the lens system 47, one could diverge the beam so that any type of camera of any size could be mounted directly at port 23 and receive proper beam size and focus.

In the example of a 35 mm camera, the focal length of lens 43 is selected to be at 137 millimeters, while the focal length of the biconcave negative lens 47 is selected to be about 45 millimeters for a 35 millimeter camera. Essentially, the focal length of lens 43 being 137 millimeters is selected rather arbitrarily. As will be explained, a focal length of 137 mm will provide the same image size on the television monitor. The image viewed by the television camera which is coupled to port 22 is transmitted to a television monitor and reproduced. This is the image that the surgeon sees in the operating microscope when using eyepieces 11 and 12 which for example typically may have 20x magnification. If the surgeon used eyepieces of a 12½x, then one would select a focal length for lens 43 of 107 mm. The negative lens 47 is selected so that it changes the converging beam of light to a diverging beam to fill the film plane of a 35 mm camera. This plane is approximately 24×36 mm. The negative lens 47 is also selected so that the focus of the beam through the lens is par focal at the film plane for various 35 millimeter cameras. The term par focal implies that the image is in focus at the film plane of the camera.

For example, consideration of the requirements for both the 35 mm camera and the television camera are as follows:

The diameter of the parallel beam of light 45 is approximately, within limits, 14 mm. This is the approximate diameter of the vidicon tube associated with the television camera 25 and is in this example, a little less than half the size of a 35 mm film plane. Thus, the coupler must both mechanically and optically connect the proper photographic instrument.

It is therefore noted that any camera such as an 8 mm or a 16 mm can be accommodated. For example, in the case of an 8 mm movie camera, which might be coupled to port 22, this has a smaller film plane size and hence, one might require additional lenses to accommodate the camera.

Shown in dashed configuration is the mirrored member 50 moved to position 50A and as controlled by the lever 26 of FIG. 1. In this position, the mirror is relatively at a forty-five degree angle with respect to center line 41 and line 42. It is noted that for this position of the mirror, port 23 is blocked and light cannot pass through port 23. On the other hand, port 22 is now open.

The mirror, as indicated, is a first surface coated mirror with a very flat front. The center of the mirror plane is positioned at the center of the optical axis so that it corresponds to the center of the vidicon tube which is coupled to port 22. To facilitate this adjustmemnt, the cam member 28 of FIG. 1 can be rotated by means of a set screw 29 to thence control the angle of the mirror within predetermined limits to allow one to center the image on the vidicon tube.

In the dashed line position, the mirror with the coated surface 51 serves to bend the converging beam of light by ninety degrees. The beam of light as reflected from the surface 51 of the mirror 50 due to the action of lens 43 is of the correct size to completely fill the plane of the vidicon.

As indicated above, the mirror also inverts the parallel beam of light 45 converged by lens 43. This beam of light is inverted due to the beam splitter 14 and hence, the reflected beam and associated image is correctly portrayed on the video monitor and thus, the relationship of the object view as seen by the surgeon is correct.

The mirror 51 serves to direct the image to the television camera or device coupled to the port 22 and straightens the image with proper focus. When the mirror is moved to the solid line position, the converging beam via lens 43 is diverged by lens 47 to fill the film plane of the camera as 24 coupled thereto.

It is important to note that in regard to good photographic techniques, one requires a full amount of light to be directed to the proper port. Hence, the coupler employs a pivotable mirror so that full light intensity can be employed with the television or 35 mm camera.

While the most important aspects of the apparatus have been described, a brief discussion of some of the other mechanical details of FIG. 2 will be added in order to clearly cover the nature of the coupler.

Shown associated with port 22 is a top ring 60 which rests on a flange 61 associated with port 22. The ring 60 is selected to accommodate typical lens assemblies of a television camera and permits one to accommodate different brands of television cameras.

The input of housing 20 or that portion associated with the input lens 43 is designated as 62 and consists of two coaxial tubular housings 63 and 64. The housing 64 is used to adjust the diaphragm 46 to vary the amount of light intensity for both ports 22 and 23. The F-stop collar ring 70 is used to adjust the tubular housing 64.

Figure 3:
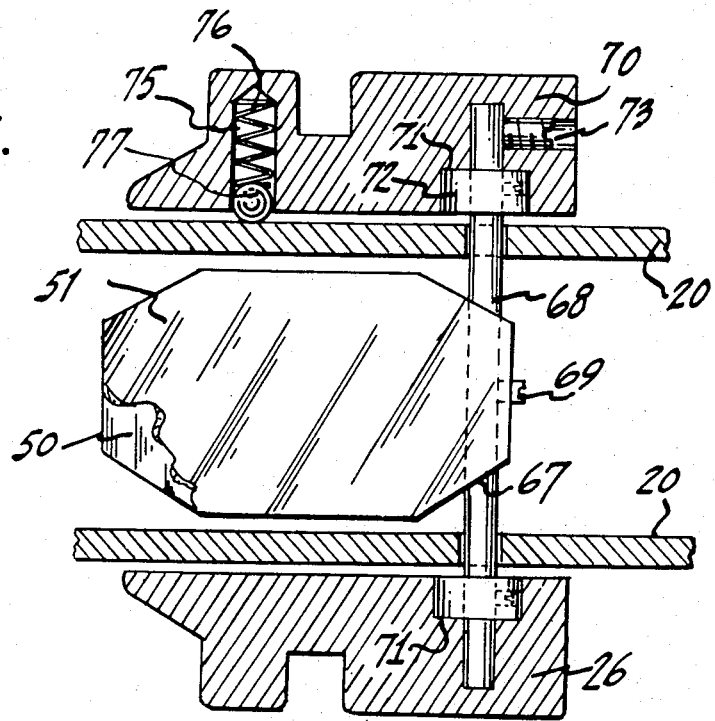
FIG. 3 is a top view of a typical mirror member employed in this invention.

The mirror 51 is shown in FIG. 3 in top view and basically has an aperture 67 located at a top surface. Through the aperture 67 is directed a suitable shaft 68; which shaft is coupled to the lever 26 and hence, as the lever is moved the mirror can pivot. It is held in place by a spring detent mechanism and such mechanisms for movement of a member or lever in a first or second position are well known.

As can be seen from FIG. 3, the shaft 68 is inserted into aperture 67 of the mirror and the mirror is retained within the aperture by the set screw 69.

Not apparent from the side view of FIG. 1 is the fact that there is an identical lever 70 on the opposite side of the housing 20. As can be seen, the shaft 68 is secured within apertures 71 in the lever arms by means of a suitable locking ring 72 and an adjustable allen screw 73. One lever arm has an aperture 75 to accommodate a spring 76 and a ball 77, as shown. The spring and ball operate as a detent to enable pivoting of the lever arm assembly when moved. The side of the housing not shown has a suitable recess to accommodate the ball of the detent.

Again, it is noted that the eccentric cam 28 when rotated will control the angle at which the mirror is positioned when reflecting light into port 22. This angle is normally at forty-five degrees, but as the eccentric cam is rotated, one can change the angle within predetermined limits. It is important to note that the eccentric cam 28 which serves to adjust the mirror operates to permit the user to center the image on the face of the vidicon tube. This is necessary for even though the beam of light 45 is parallel, it may not be centered due to mechanical tolerances and so on which exist in the microscope. Furthermore, the television camera as 25 is not really designed so that the vidicon tube is optically centered in relation to the housing of the camera or in relation to the physical means of attaching the camera to the port 22 and hence, the eccentric cam will serve to enable one to adjust the mirror so that the image reflected to the vidicon tube is properly centered.

The above described coupler serves to enable one to switch between a television camera and a 35 mm came simply and efficiently while further serving to enable a constant monitoring of the procedure by freeing a beam splitter port as 16 to be employed to monitor the procedure by a surgical assistant.

It can be ascertained by those skilled in the art that the particular coupler and apparatus would have utility in the research field as well as for other industrial and related uses as it particularly enables one to optimumly switch a parallel beam of light while accommodating different types of photographic equipment at the output ports.

I claim:

1. A method of splitting a parallel beam of light indicative of the image of an object viewed by a microscope to enable par focal registration of said image at first and second camera locations, comprising the steps of:
    (a) directing said beam of light to propagate through a first input aperture,
    (b) converging said beam as directed through said input aperture,
    (c) bending said converged beam at a predetermined distance from said input aperture at relatively an angle of ninety degrees to direct said beam to said second location,
    (d) placing a camera at said second location for receiving said bent beam at par focal registration,
    (e) diverging said converged beam as directed through said input aperture to direct said beam to said first location,
    (f) placing a camera at said first location for receiving said diverged beam at par focal registration.

2. The method according to claim 1 wherein said camera at said second location is a television camera.

3. The method according to claim 1 wherein said camera at said first location is a film camera.

4. The method according to claim 1 wherein the step of bending said beam includes placing a mirror at said predetermined distance at an angle of forty-five degrees with respect to the axis of said light beam to receive and bend said converged beam an angle of ninety degrees.

5. The method according to claim 1 wherein said step of converging said beam includes placing a first convex lens at said input aperture.

6. The method according to claim 5 wherein said step of diverging said beam includes placing a biconcave lens after said first convex lens and nearer said first location.

* * * * *